United States Patent
Lalinde

(10) Patent No.: US 11,112,834 B2
(45) Date of Patent: Sep. 7, 2021

(54) ROTATABLE KEYBOARD

(71) Applicant: HEWLETT-PACKARD DEVELOPMENT COMPANY, L.P., Houston, TX (US)

(72) Inventor: Paul Roberto Lalinde, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 157 days.

(21) Appl. No.: 16/092,201

(22) PCT Filed: Jul. 29, 2016

(86) PCT No.: PCT/US2016/044880
§ 371 (c)(1),
(2) Date: Oct. 8, 2018

(87) PCT Pub. No.: WO2018/022113
PCT Pub. Date: Feb. 1, 2018

(65) Prior Publication Data
US 2020/0333851 A1    Oct. 22, 2020

(51) Int. Cl.
*G06F 1/16* (2006.01)

(52) U.S. Cl.
CPC ................... *G06F 1/1664* (2013.01)

(58) Field of Classification Search
CPC ......... G06F 1/1664; G06F 1/16; G06F 1/1622
See application file for complete search history.

(56) References Cited

U.S. PATENT DOCUMENTS

| 5,229,757 A * | 7/1993 | Takamiya ............ F16M 11/10 235/145 R |
| 6,297,752 B1 | 10/2001 | Ni |
| 8,896,541 B2 | 11/2014 | Huang |

(Continued)

FOREIGN PATENT DOCUMENTS

| CN | 100468281 C | 3/2009 |
| CN | 202904485 U | 4/2013 |

(Continued)

OTHER PUBLICATIONS

A Laptop with Ergonomic Keyboard?, Jun. 18, 2014.
"Ultraergo Wireless RF Split Keyboard Travel Bundle", 2014.
Microsoft's Sculpt Ergonomic Keyboard, Aug 30, 2013.

*Primary Examiner* — Kenneth B Lee, Jr.
(74) *Attorney, Agent, or Firm* — Brooks, Cameron & Huebsch PLLC

(57) ABSTRACT

Example implementations relate to a rotatable keyboard. For example, an input control housing of a computing device according to the present disclosure may include a first segment including a first portion of keyboard keys, the first segment connected to a display housing via a first connection. The input control housing may include a second segment, physically separate from the first segment, including a second portion of the keyboard keys, the second segment connected to the display housing via a second connection. The first portion of keyboard keys may be rotatable three hundred and sixty degrees on a face of the first segment, and the second portion of the keyboard may be rotatable three hundred and sixty degrees on a face of the second segment.

15 Claims, 7 Drawing Sheets

(56) References Cited

U.S. PATENT DOCUMENTS

| | | | |
|---|---|---|---|
| 8,946,535 B2 | 2/2015 | Bowen | |
| 2004/0061683 A1 | 4/2004 | Mochizuki et al. | |
| 2004/0095326 A1* | 5/2004 | Anderson | G06F 3/0202 345/168 |
| 2007/0279387 A1* | 12/2007 | Pletikosa | G06F 1/1656 345/169 |
| 2014/0186084 A1 | 7/2014 | Dickenson et al. | |
| 2015/0169008 A1 | 6/2015 | Dickenson et al. | |
| 2016/0139680 A1 | 5/2016 | Noorzai et al. | |

FOREIGN PATENT DOCUMENTS

| | | |
|---|---|---|
| EP | 2696253 A2 | 5/2006 |
| JP | 201417014 A | 1/2014 |
| RU | 2101752 C1 | 1/1998 |
| RU | 2398262 C2 | 8/2010 |
| TW | M377847 | 4/2010 |
| TW | I350960 | 10/2011 |
| TW | 201430620 A | 8/2014 |
| TW | 201431460 A | 8/2014 |

\* cited by examiner

ROTATABLE KEYBOARD

BACKGROUND

Computing devices may utilize inputs from an input control. An input control may convert human interaction into digital signals to the computing device. The configuration of the input control may be limited by its function and the configuration of the computing device with which it interacts.

DETAILED DESCRIPTION

Figure 1:
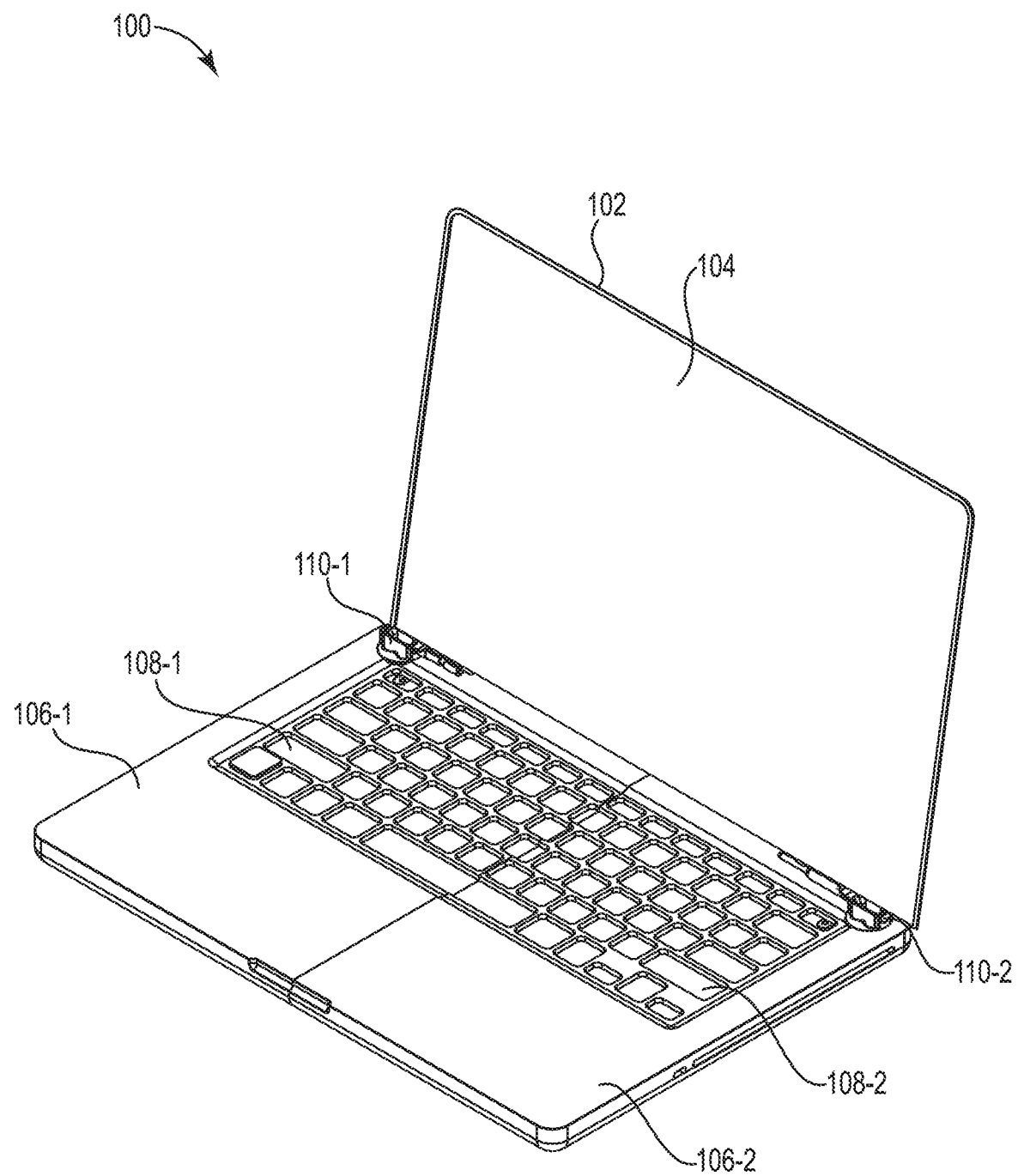
FIG. 1 illustrates an example of a computing system in a notebook configuration according to the present disclosure.

Input controls may allow a user to interact with and control a computing device. Input controls may include keyboards, pointers, a mouse, a mousepad, and/or other controls for accepting user interaction and converting mechanical forces to digital signals. As used herein, a keyboard refers to an arrangement of buttons or keys to act as a mechanical lever or electronic switch. The keyboard may include individual keys engraved or printed with characters on the keys and the press of the key may correspond to electronic communication of the written symbol displayed thereupon to a computing device. The keyboard may have any alphanumeric arrangement of individual keys. For example, the keys of a keyboard may be configured in a QWERTY layout. As used herein, a QWERTY layout or keyboard configuration may include the standard English keyboard arrangement having the keys in traditional typewriter arrangement, with the letters q, w, e, r, t, y being the first six of the top row of alphabetic characters, starting from the left side.

As used herein, an input control housing refers to a housing dedicated to the input controls and the circuitry associated with converting the mechanical manipulation of the input controls to digital signals. For example, the input control housing may include a housing that houses a keyboard and/or the associated circuitry such as in a standalone keyboard device connectable to the computing device. Alternatively, the input control housing may include additional components utilized in the operation of a computing device including the computing components of the computing device itself. For example, the input control housing may house speakers, batteries, processors, antennas, memory, circuitry, and/or cooling components, among other examples. In an example, the input control housing may be the lower portion of a laptop with a clamshell form factor having a display in the upper portion. The input control housing may house a keyboard in addition to other input controls such as a mouse pad, volume controls, various outlets, various ports, various inputs, etc.

An input control housing and the input controls housed thereupon may be configured to fit within a particular form factor of a computing device. For example, input controls may be configured to fit within the footprint of an input control housing and the input control housing may be configured to fit within the footprint of a display housing that may fold over and cover the input control housing when folded shut in a typical clamshell form factor computing device.

The configuration of the input controls may not be able to be customized and/or ergonomically adapted to a particular user and/or mode of use. That is, the form of the input controls may follow the form of the input control housing, which may follow the function of the computing device that the input controls are in communication with. The result may be that the use of the computing device is inconvenient. For example, the screen may be placed too far away from the user, encouraging the user to strain his or her musculature to compensate for the distance. In an example, a keyboard may be arranged such that the wrists and/or elbows of a user are cocked at an unnatural angle to effectuate keystrokes. Even in instances where configurations of the input controls have been designed to compensate for biomechanical characteristics of the user, the precise arrangement is often not a fit for every user since mass production of the input controls dictates a common design geared to an average user. Ergonomic input controls may not compensate for or accommodate biomechanical differences between users of different heights, weights, sexes, physical abilities, infirmities, preferences, and/or modes of use.

In contrast, examples of the present disclosure describe fully adjustable, customizable, and ergonomic input control housings and input controls. An input control housing may include a first segment including a first portion of keys and a second segment including a second portion of the keyboard keys. The first segment and the second segment may be rotatable three hundred and sixty degrees about respective connections to a display housing. Alternatively or additionally, the first portion of keys and the second portion of the keys may be rotatable three hundred and sixty degrees on a face of the first segment and second segment, respectively.

FIG. 1 illustrates an example of a computing system 100 in a notebook configuration according to the present disclosure. The computing system 100 may include a display housing 102. The display housing 102 may include a display 104. The display 104 may include a screen for displaying images generated by the computing system 100. The screen may include a liquid-crystal display (LCD) screen and/or a protective covering. The screen may include a light-emitting diode (LED) screen and/or a protective covering.

The display housing 102 may include electronic components that are utilized in displaying the images generated by the computing system 100 through the display 104. The display housing 102 may include additional components. For example, the display housing 102 may include wiring and connections to communicate with input controls. The display housing 102 may include computing components such as speakers, batteries, processors, antennas, memory, circuitry, cooling components, etc. For example, the display housing 102 may be the body and computing hardware of a tablet style computing device.

The computing system 100 may include an input control housing. The input control housing (e.g., 106-1 and 106-2) may be made up of a plurality of segments. For example, the input control housing may include a first segment 106-1 and a second segment 106-2. The first segment 106-1 and second segment 106-2 may collectively comprise the input control housing. The first segment 106-1 and the second segment 106-2 may be physically separate segments. Elements within the first segment 106-1 and the second segment 106-2 may communicate with each other and with the rest of the computing system 100 through wired connections to and/or through the display housing 102. The first segment 106-1 and the second segment 106-2 may be approximate halves of the input control housing. That is, the input control housing may be split approximately in half into the first segment 106-1 and the second segment 106-2. If the input control housing includes computing components such as speakers, batteries, processors, antennas, memory, circuitry, cooling components, controllers, etc. may be split among the first segment 106-1, a second segment 106-2 and/or a display housing 102.

The input control housing may house input controls (e.g., 108-1 and 108-2) for the computing system 100. The input controls may include a keyboard, such as a QWERTY configured arrangement of alphanumeric input keys. The first segment 106-1 and the second segment 106-2 may include a respective portion of keyboard keys. For example, the first segment 106-1 may include a first portion of the keyboard keys 108-1. The first portion of keyboard keys 108-1 may include a first half of QWERTY configured keyboard keys. The first portion of the keyboard keys 108-1 may include a left half of QWERTY keyboard keys. The first portion of keyboard keys 108-1 may include a keyboard segment including a plurality of keys bonded together and removable from the first segment 106-1. The first portion of keyboard keys 108-1 may include a keyboard segment including a plurality of keys bonded together and rotatable on the surface of the first segment 106-1.

The second segment 106-2 may include a second portion of the keyboard keys 108-2. The second portion of keyboard keys 108-2 may include a second half of QWERTY configured keyboard keys. The second portion of the keyboard keys 108-2 may include a right half of QWERTY keyboard keys. The second portion of keyboard keys 108-2 may include a keyboard segment including a plurality of keys bonded together and removable from the second segment 106-2. The first portion of keyboard keys 108-2 may include a keyboard segment including a plurality of keys bonded together and rotatable on the surface of the second segment 106-2.

The first portion of keyboard keys 108-1 and the second portion of keyboard keys 108-2 may be unseated from their respective connections with the first segment 106-1 and the second segment 106-2. For example, the first portion of keyboard keys 108-1 may be peeled out of a mating cavity of the first segment 106-1 similar to how a lid may be peeled off of a plastic food storage container unseating the lid. The first portion of keyboard keys 108-1 and the second portion of keyboard keys 108-2 may be re-seated to a connection with their respective connections with the first segment 106-1 and the second segment 106-2. For example, the first portion of the keyboard keys 108-1 may be stuck back into a mating cavity of the first segment 106-1.

The first portion of keyboard keys 108-1 and the second portion of keyboard keys 108-2 may be rotated freely while they are unseated from their respective connections with the first segment 106-1 and the second segment 106-2. For example, the second portion of keyboard keys 108-2 may be rotated three hundred and sixty degrees relative to a starting configuration on the face of the second segment 106-2. However, the first portion of keyboard keys 108-1 and the second portion of keyboard keys 108-2 may be limited to reseating at ninety degree angles with respect to their starting seated position on the face of the first segment 106-1 and the second segment 106-2.

For example, the first segment 106-1 and the second segment 106-2 each may have a plurality of connections for connecting with the corresponding portion of keyboard keys. In an example, the plurality of physical connections may include four distinct connections corresponding to each of four connections spaced at a specified angle, such as ninety degrees, relative to a central point that correspond to seating positions for the first portion of keyboard keys 108-1 on the first segment 106-1 and the second portion of keyboard keys 108-2 on the second segment 106-2.

As illustrated in FIG. 1, the computing system 100 may be arranged in a notebook mode. A notebook mode may include a mode of operation by the computing system corresponding to the illustrated configuration of the first segment 106-1 and the second segment 106-2. For example, in the notebook mode the first segment 106-1 and the second segment 106-2 may be aligned with one another such that they touch or nearly touch forming a complete contiguous QWERTY keyboard having a contiguous rectangular shape despite being physically separate and independently adjustable. In the notebook mode the first segment 106-1 and the second segment 106-2 may fit within a footprint that substantially coincides with the footprint of the display housing 102. As used herein, a footprint may include the area covered by display housing 102. The footprint may include the area covered by the display housing 102 and therefore hidden from view in an en face view of the display 104 face of the display housing 102 or the face opposite the display 104 face of the display housing 102. For example, the first segment 106-1 and the second segment 106-2 may be substantially covered by the display housing when the display housing 102 is lowered to achieve a folded shut configuration in a clamshell form factor for the computing system 100 and the computing system 100 is viewed in an en face view of the face of the display housing 102 opposite the display 104 face. In the notebook mode, the first segment 106-1 and the second segment 106-2 may extend substantially perpendicular to the display housing 102 on the same side as the display 104. That is, if the display housing 102 is lowered over the first segment 106-1 and the second segment 106-2 to achieve a folded shut configuration in a clamshell form factor for the computing system 100, the display 104 is face to face with the first portion of keyboard keys 108-1 and the second portion of keyboard keys 108-2. In notebook mode the computing system 100 may operate according to default notebook computer settings.

The computing system 100 may include a plurality of connections (e.g., 110-1 and 110-2). For example, the computing system 100 may include a first connection 110-1 and a second connection 110-2. The first connection 110-1 and the second connection 110-2 may include a hinge mechanism as discussed in greater detail in association with FIG. 6 and FIG. 7. The first connection 110-1 may connect the first segment 106-1 of the input control housing to the display housing 102 and allow the two pieces to articulate and rotate with respect to one another. The second connection 110-2 may connect the second segment 106-2 of the input control housing to the display housing 102 and allow the two pieces to articulate and rotate with respect to one another.

The first connection 110-1 and the second connection 110-2 may serve as a conduit for wiring passing from the input control housing to the display housing 102. For example, the first connection 110-1 may include wiring and/or other connections between the contents of the first segment 106-1 and the contents of the display housing 102. The second connection 110-2 may include wiring and/or other connections between the contents of the second segment 106-2 and the contents of the display housing 102.

The first connection 110-1 and the second connection 110-2 may accommodate three hundred and sixty degrees of rotation of the display housing 102 about the connections. For example, the three hundred and sixty degrees of rotation of the display housing 102 may be relative to an axis extending between the first connection 110-1 and the second connection 110-2 parallel to, below, and along the width of the display housing 102. For example, as illustrated in FIG. 1 the first connection 110-1 and the second connection 110-2 include opposing pins pointing at one another. The pins may lie along the axis about which the three hundred sixty degrees of rotation of the display housing 102 may occur.

The first connection 110-1 may accommodate three hundred and sixty degrees of rotation of the first segment 106-1 about the connection 110-1. For example, the first connection 110-1 may include a portion of the connection 110-1 that is seated within a portion (e.g., a sleeve) of the first segment 106-1 and/or a leaf of the connection 110-1 connected to the first segment 106-1. The portion of the connection 110-1 may be able to rotate within the sleeve accommodating three hundred and sixty degrees of rotation of the first segment 106-1 relative to the connection 110-1. For example, the first segment 106-1 may rotate three hundred and sixty degrees about an axis running through the connection 110-1 into the first segment 106-1 perpendicular to the axis about which the display housing 102 is rotatable.

The second connection 110-2 may accommodate three hundred and sixty degrees of rotation of the second segment 106-2 about the connection 110-2. For example, the second connection 110-2 may include a portion of the connection 110-2 that is seated within a portion (e.g., a sleeve) of the second segment 106-2 and/or a leaf of the second connection 110-2 connected to the second segment 106-2. The portion of the second connection 110-2 may be able to rotate within the sleeve accommodating three hundred and sixty degrees of rotation of the second segment 106-2 relative to the second connection 110-2. For example, the second segment 106-2 may rotate three hundred and sixty degrees about an axis running through the second connection 110-2 into the second segment 106-2 perpendicular to the axis about which the display housing 102 is rotatable.

Figure 2:
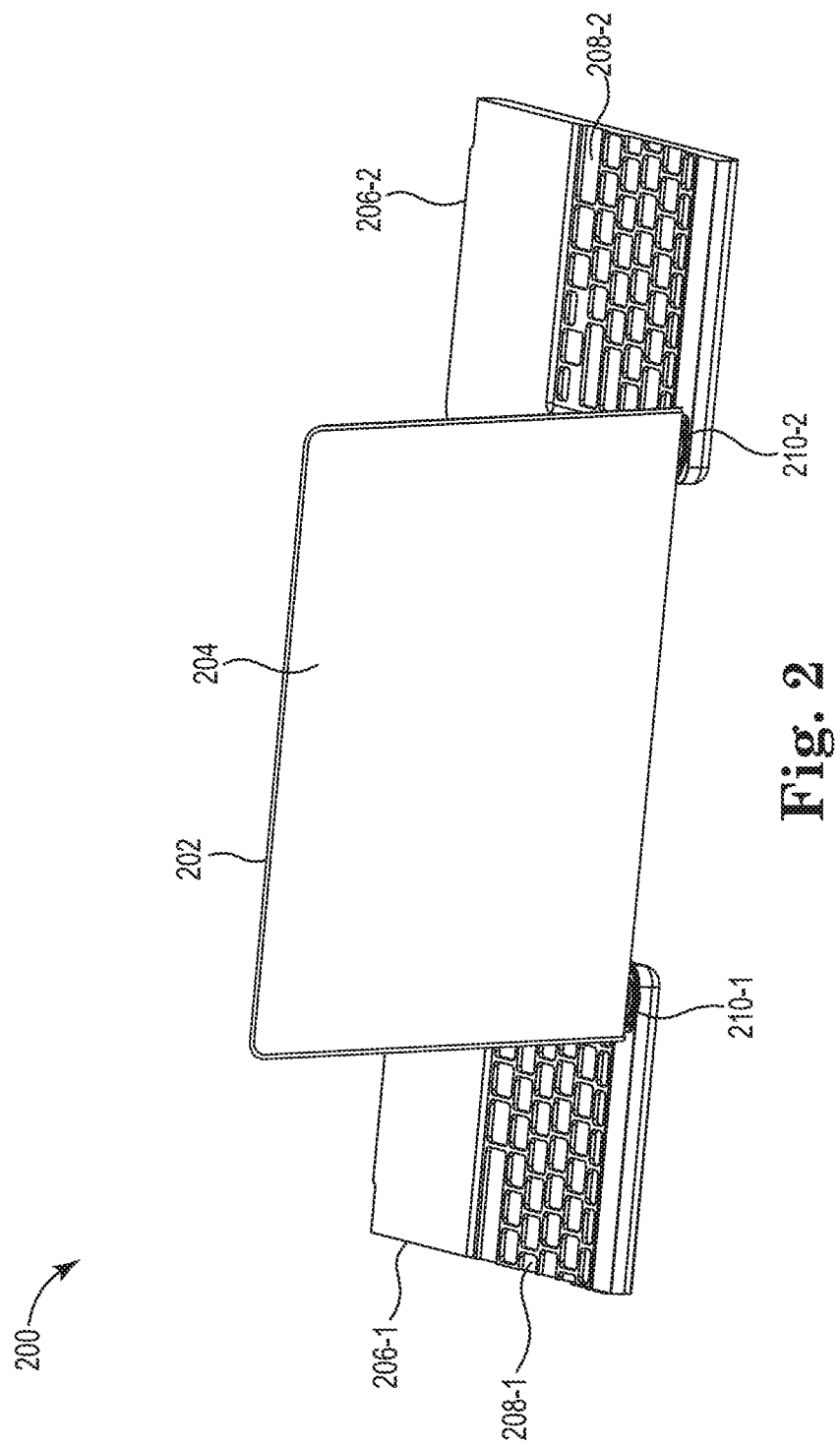
FIG. 2 illustrates an example of a computing system in a presentation configuration according to the present disclosure.

FIG. 2 illustrates an example of a computing system 200 in a presentation configuration according to the present disclosure. The computing system 200 may include a display housing 202, a display 204, an input control housing including a first segment 206-1 and a second segment 206-2, a first portion of keyboard keys 208-1, a second portion of keyboard keys 208-2, a first connection 210-1, and/or a second connection 210-2.

The computing system 200 may be in a presentation configuration. In the presentation configuration the first segment 206-1 may be rotated one hundred eighty degrees from its position in the notebook configuration. The second segment 206-2 may be rotated one hundred eighty degrees from its position in the notebook configuration.

Utilizing the computing system 200 in the presentation configuration may activate a presentation mode of the computing system 200. Activating a presentation mode may include changing settings of the computing system 200 to be better suited for delivering a presentation. For example, activating presentation mode made adjust the brightness and contrast of the screen, the volume of the speakers, the size of images displayed and/or the function of particular input controls on the first segment 206-1 and the second segment 206-2.

The presentation mode may accommodate utilization of the computing system 200 by the user in one of two ways. First, the computing system may accommodate a user sitting in front of the computing system 200 (e.g., facing the display 204) and utilizing the first portion of the keyboard keys 208-1 and the second portion of the keyboard keys 208-2 behind and off to either side of the display housing 202. In this manner, the display 204 may be brought closer to the user since the user is not restricted by having the keyboard between themselves and the display housing 202.

In the presentation configuration the first segment 206-1 and the second segment 206-2 may be rotated outside of the footprint of the display housing 202 when a face of the display housing 202 is oriented substantially parallel to a face of the first segment 206-1 and a face of the second segment 206-2. For example, when the display housing 202 is rotated about the first connection 210-1 and the second connection 210-2 such that the display housing 202 is parallel with a work surface such as a table and the viewable face of the display 204 is either entirely facing the table or entirely facing away from the table, the majority of the first segment 206-1 and the majority of the second segment 206-2 is outside of the footprint of the display housing 202 relative to the work surface.

The first portion of the keyboard keys 208-1 and the second portion of the keyboard keys 208-2 may be wholly outside of the footprint of the display housing 202 as described above. Such a configuration may allow a user to utilize the first portion of the keyboard keys 208-1 and the second portion of the keyboard keys 208-2 along the left and right sides of the display housing 202 without the display housing 202 interfering with hand positioning or key strokes.

The first segment 206-1 and the second segment 206-2 are completely separated in the presentation mode. The first segment 206-1 and the second segment 206-2 maintain wired communication with the display housing 202 through their respective connections (e.g., 210-1 and 210-2). The wired communication may include communication with the contents of the display housing 202. Additionally, the first segment 206-1 and the second segment 206-2 and the contents thereof may be in wired communication with one another through the first connection 210-1, the second connection 210-2, and the display housing 202.

The first portion of keyboard keys 208-1 may be unseated from the surface of the first segment 206-1 and the second portion of keyboard keys 208-2 may be unseated from the surface of the second segment 206-2. The first portion of keyboard keys 208-1 may be rotated one hundred and eighty degrees and reseated on the surface of the first segment 206-1 and the second portion of the keyboard keys 208-2 may be rotated one hundred and eighty degrees and reseated on the surface of the second segment 206-2. As a result, the user facing the display 204 will be presented a QWERTY configured keyboard with the first portion of keyboard keys 208-1 and the second portion of keyboard keys 208-2 separated by the display housing 204 instead of the inverted QWERTY configuration that would result from the rotation.

Figure 3:
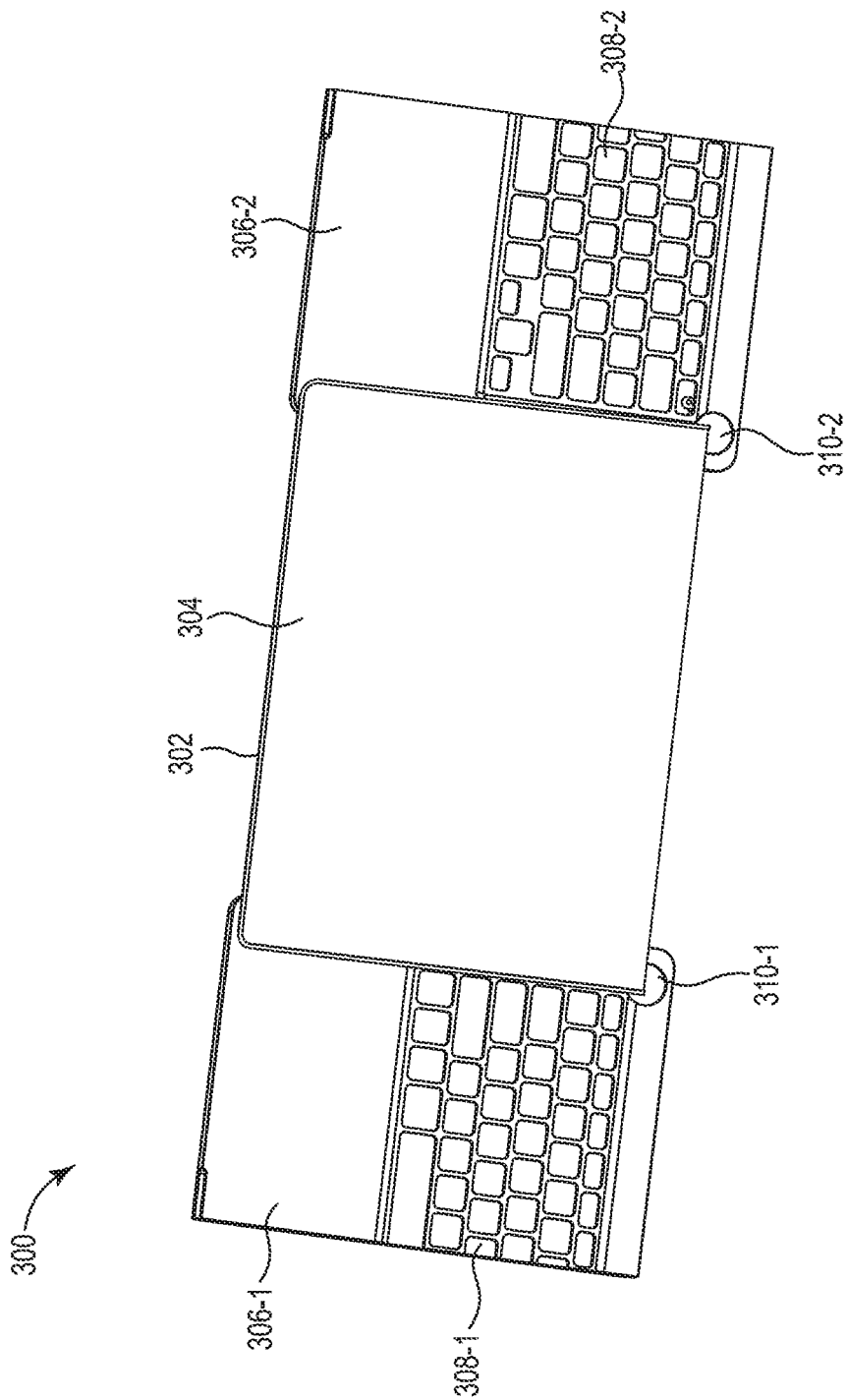
FIG. 3 illustrates an example of a computing system in a tablet configuration according to the present disclosure.

FIG. 3 illustrates an example of a computing system 300 in a tablet configuration according to the present disclosure. The computing system 300 may include a display housing 302, a display 304, an input control housing including a first segment 306-1 and a second segment 306-2, a first portion of keyboard keys 308-1, a second portion of keyboard keys 308-2, a first connection 310-1, and/or a second connection 310-2.

The computing system 300 may be in a tablet configuration. In the tablet configuration the first segment 306-1 and the second segment 306-2 may be rotated to the same position as in the presentation configuration. For example, the first segment 306-1 and the second segment 306-2 may be rotated one hundred eighty degrees from their respective positions in the notebook configuration.

In the tablet configuration, the display housing 302 may be rotated at the first connection 310-1 and the second connection 310-2 approximately ninety degrees from its position in the notebook mode and the presentation mode about an axis extending between the first connection 310-1 and the second connection 310-2 parallel to a side edge 311 of the display housing 302. In the tablet configuration, the display housing 302 may be brought parallel to a work surface, such as a table, with the display 304 facing away from the work surface.

In the tablet configuration, the first segment 306-1 and the second segment 306-2 are substantially outside of the footprint of the display housing 302. In the table configuration, the first portion of keyboard keys 308-1 and the second portion of keyboard keys 308-2 may be wholly outside of the footprint of the display housing 302. The first portion of keyboard keys 308-1 and the second portion of keyboard keys 308-2 may be accessible to a user despite the display housing 302 being folded flat over the first segment 306-1 and the second segment 306-2 since the first segment 306-1 and the second segment 306-2 have been rotated such that they are out of the way of the footprint of the folded flat display housing 302.

Utilizing the computing system 300 in the tablet configuration may activate a tablet mode of the computing system 300. Activating a tablet mode may include changing settings of the computing system 300 to suit a tablet style use of the computing system 300. For example, activating tablet mode may activate a touch control functionality of the display 304, activate a stylus, activate particular touch commands (e.g., pinch to zoom, swipe to close, etc.), and/or alter the function of particular input controls on the first segment 306-1 and the second segment 306-2 (e.g., deactivate a mouse pad, alter the function of a mouse pad, deactivate the keyboard keys, etc.).

The first segment 306-1 and the second segment 306-2 are completely separated in the tablet configuration. The first segment 306-1 and the second segment 306-2 may maintain wired communication with the display housing 302 through their respective connections (e.g., 310-1 and 310-2). The wired communication may include communication with the contents of the display housing 302. Additionally, the first segment 306-1 and the second segment 306-2 and the contents thereof may be in wired communication with one another through the first connection 310-1, the second connection 310-2, and the display housing 302. However, examples are not so limited, and in some examples, the first segment 306-1 and the second segment 306-2 may maintain wireless communication with the display housing 302.

As with the presentation configuration, in the tablet configuration the first portion of keyboard keys 308-1 may be unseated from the surface of the first segment 306-1 and the second portion of keyboard keys 308-2 may be unseated from the surface of the second segment 306-2. The first portion of keyboard keys 308-1 may be rotated one hundred and eighty degrees and reseated on the surface of the first segment 306-1 and the second portion of the keyboard keys 308-2 may be rotated one hundred and eighty degrees and reseated on the surface of the second segment 306-2. As a result, the user facing the display 304 with an approach from the connection side will be presented a QWERTY configured keyboard with the first portion of keyboard keys 308-1 and the second portion of keyboard keys 308-2 separated by the display housing 304 instead of the inverted QWERTY configuration that would result from the rotation.

Alternatively, the first portion of keyboard keys 308-1 may be unseated from the first segment 306-1 and the second portion of keyboard keys 308-2 may be unseated from the second segment 306-2 and the two may be swapped without rotation. That is, the first portion of keyboard keys 308-1 may be reseated on the surface of the second segment 306-2 without rotation and the second portion of the keyboard keys 308-2 may be reseated on the surface of the first segment 306-1 without rotation. As a result, the user facing the display 304 with an approach from the non-connection side will be presented a QWERTY configured keyboard with the first portion of keyboard keys 308-1 and the second portion of keyboard keys 308-2 separated by the display housing 304 instead of the backwards QWERTY configuration that would result from the rotation.

Figure 4:
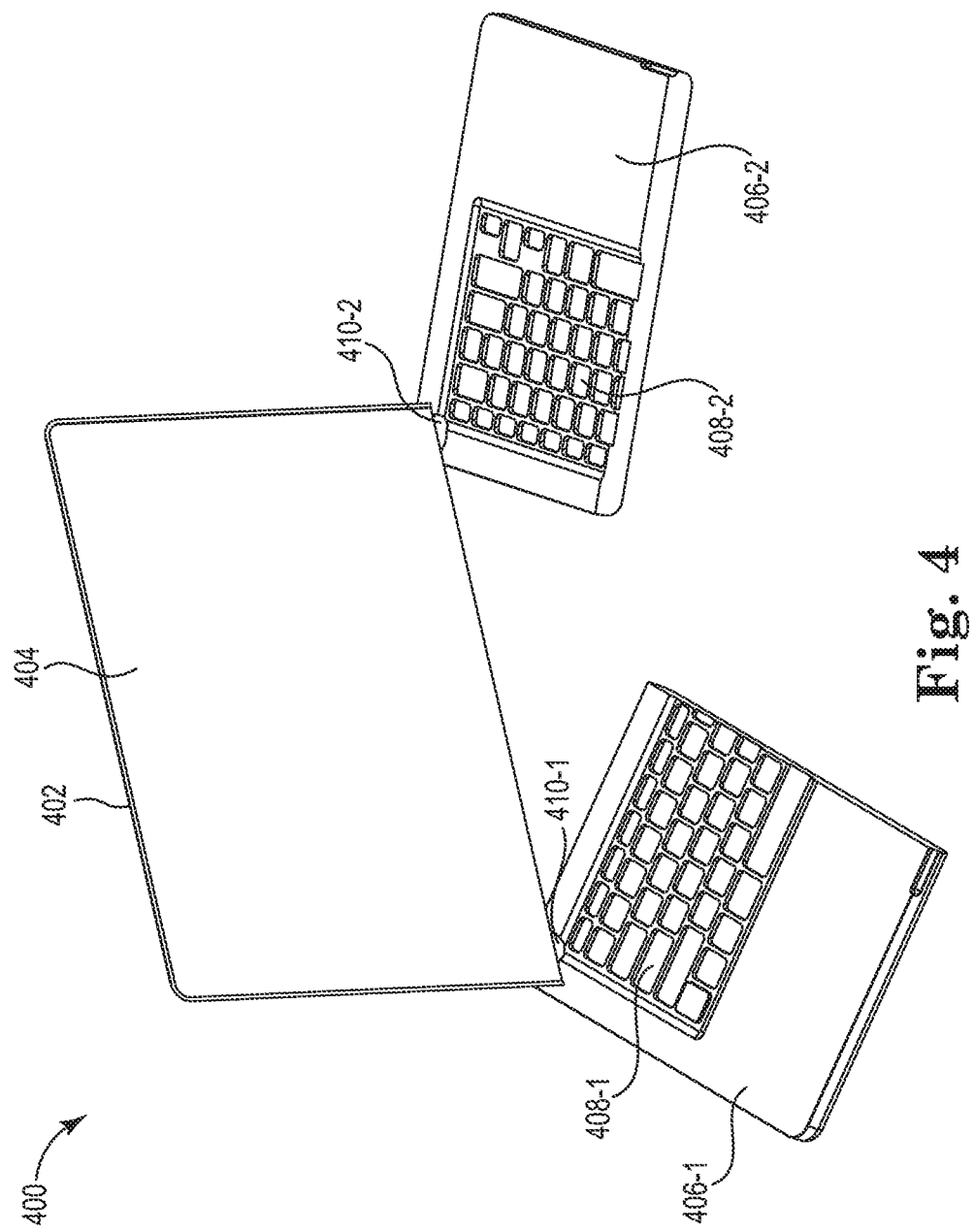
FIG. 4 illustrates an example of a computing system in an ergonomic configuration according to the present disclosure.

FIG. 4 illustrates an example of a computing system 400 in an ergonomic configuration according to the present disclosure. The computing system 400 may include a display housing 402, a display 404, an input control housing including a first segment 406-1 and a second segment 406-2, a first portion of keyboard keys 408-1, a second portion of keyboard keys 408-2, a first connection 410-1, and/or a second connection 410-2.

The computing system 400 may be in an ergonomic configuration. In the ergonomic configuration the first segment 406-1 and the second segment 406-2 may be rotated about the first connection 410-1 and the second connection 410-2, respectively, to impart a splay to the first portion of keyboard keys 408-1 and the second portion of keyboard keys 408-2. For example, instead of the keyboard keys being substantially squared with the display housing 402, the ergonomic configuration may include a first segment 406-1 and a second segment canted at approximately forty five degree angles from square with the display housing 402. The first segment 406-1 and the second segment 406-2 may be rotated approximately forty five degrees about their respective connections (e.g., 410-1 and 410-2) from the notebook configuration to impart the cant. The first segment 406-1 and the second segment 406-2 may be rotated any amount about their respective connections (e.g., 410-1 and 410-2) to an angle a user finds comfortable and/or the first segment 406-1 and the second segment 406-2 may be rotated to different angles.

In the ergonomic configuration, a user may adjust the angle of the first segment 406-1 and the second segment 406-2 relative to their particular biomechanics of use. A user may adjust the angle of the first segment 406-1 and the second segment 406-2 such that when they utilize the first portion of keyboard keys 408-1 and the second portion of keyboard keys 408-2 the portions contour to their biomechanics rather than necessitating a biomechanical adaptation by the user (e.g., poor posture, shoulder shrug, elbow misalignment, wrist contortion, etc.).

The display housing 402 may be maintained in a configuration substantially similar to the notebook configuration and/or the presentation configuration. That is, the display housing 402 may be maintained substantially erect with the display 404 oriented toward a user substantially perpendicular to the upper surface of the first segment 406-1 and the second segment 406-2. However, by virtue of splitting the first segment 406-1 and the second segment 406-2, the display housing 402 and the display 404 may be situated closer to a user since some of the space formerly occupied by the first segment 406-1, second segment 406-2, and the body parts of the user crowded in front of the first segment 406-1 and the second segment 406-2 to effectuate keystrokes is vacated by the spreading out of the controls.

In the ergonomic configuration, the first segment 406-1 and the second segment 406-2 may be partially outside of the footprint of the display housing 402. In order to shut the computing device 400, the first segment 406-1 and the second segment 406-2 may be rotated back into a substantially notebook configuration before the display housing 402 is closed over the top of the first segment 406-1 and the second segment 406-2.

Utilizing the computing system 400 in the ergonomic configuration may activate an ergonomic mode of the computing system 400. Activating an ergonomic mode may include changing settings of the computing system 400 to predetermined settings to suit the preferences and/or biomechanics of the particular user. For example, activating ergonomic mode may adjust the brightness and/or contrast of the display 404, display tips or other information on display 404, and/or alter the function of particular input controls on the first segment 306-1 and the second segment 306-2 (e.g., deactivate a mouse pad, alter the function of a mouse pad, modify functions associated with particular keystrokes, etc.).

The first segment 406-1 and the second segment 406-2 may be completely physically separated in the ergonomic configuration. The first segment 406-1 and the second segment 406-2 may maintain wired communication with the display housing 402 through their respective connections (e.g., 410-1 and 410-2). The wired communication may include communication with the contents of the display housing 402. Additionally, the first segment 406-1 and the second segment 406-2 and the contents thereof may be in wired communication with one another through the first connection 410-1, the second connection 410-2, and the display housing 402.

Figure 5:
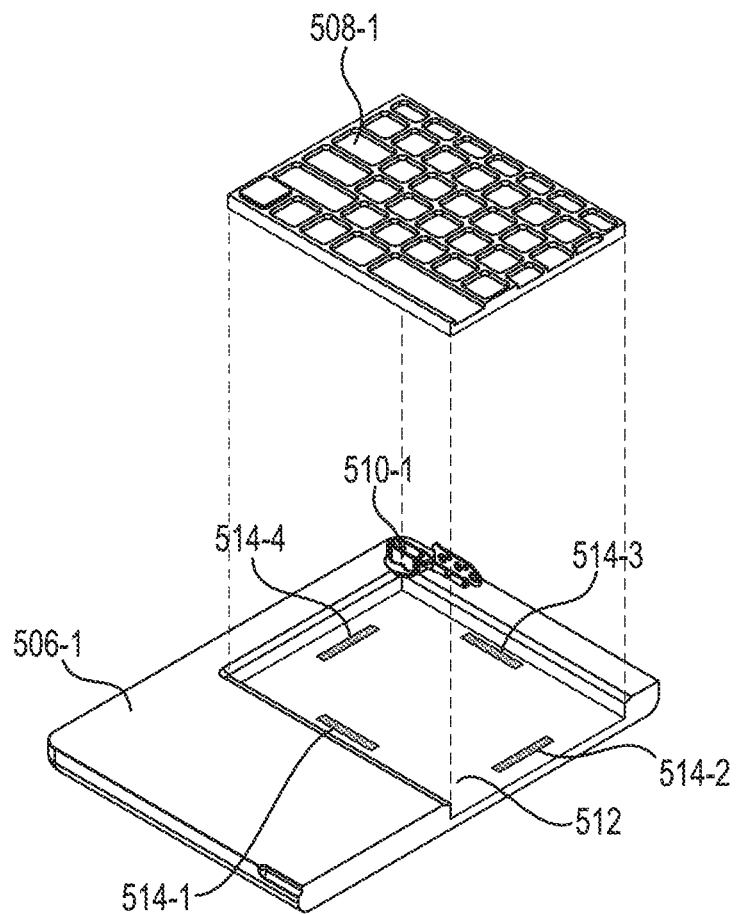
FIG. 5 illustrates an exploded view of an example of a segment of an input control housing according to the present disclosure.

FIG. 5 illustrates an exploded view of an example of a segment of an input control housing according to the present disclosure. The example may include a first segment 506-1 of an input control housing. The first segment 506-1 may include a first portion of keyboard keys 508-1. FIG. 5 illustrates the first portion of the keyboard keys 508-1 unseated from the first segment 506-1. While unseated, the first portion of the keyboard keys 508-1 are rotatable three hundred and sixty degrees about an axis extending through the center of the face of the first portion of the keyboard keys 508-1 down into the first segment 506-1.

The first portion of the keyboard keys 508-1 may be reseated into a corresponding recess 512-1 on the face of the first segment 506-1. The recess 512 may have dimensions that accommodate a substantially secure fit of the first portion of the keyboard keys 508-1 into the recess 512. The recess 512 may include keyboard connections 514-1 . . . 514-N. The keyboard connections 514-1 . . . 514-N may connect with complementary connections located on the first portion of the keyboard keys 508-1. The keyboard connections 514-1 . . . 514-N may accommodate an electrical and/or mechanical connection between the first segment 506-1 and the first portion of the keyboard keys 508-1 in four distinct orientations. For example, the first portion of the keyboard keys 508-1 may be reseatable and form connections with the first segment 506-1 at a first orientation, at a second orientation where the first portion of the keyboard keys 508-1 is rotated ninety degrees about an axis extending through the center of the face of the first portion of the keyboard keys 508-1 down into the first segment 506-1, a third orientation where the first portion of the keyboard keys 508-1 is rotated another ninety degrees about an axis extending through the center of the face of the first portion of the keyboard keys 508-1 down into the first segment 506-1, and a fourth orientation where the first portion of the keyboard keys 508-1 is rotated another ninety degrees about an axis extending through the center of the face of the first portion of the keyboard keys 508-1 down into the first segment 506-1. The rotation of the first portion of the keyboard keys 508-1 may accommodate user input from the four orientations. The above discussion is equally applicable to a second segment and a second portion of the keyboard keys although not explicitly illustrated.

The orientation of the first and second portions of the keyboard keys may be communicated to a computing device. For example, the orientation of the first portion of the keyboard keys 508-1 may be communicated to a computing device based on the particular connection formed between the first portion of the keyboard keys 508-1 and the first segment 506-1. Based on the orientation, the computing device may adjust the settings of the computing device. For example, the computing device may switch the orientation of images on the display to match the orientation of the first portion of the keyboard keys 508-1. Put another way, the computing device may display images so that they will be viewed right-side-up by a user utilizing the first portion of the keyboard keys 508-1 in their communicated orientation.

Figure 6:
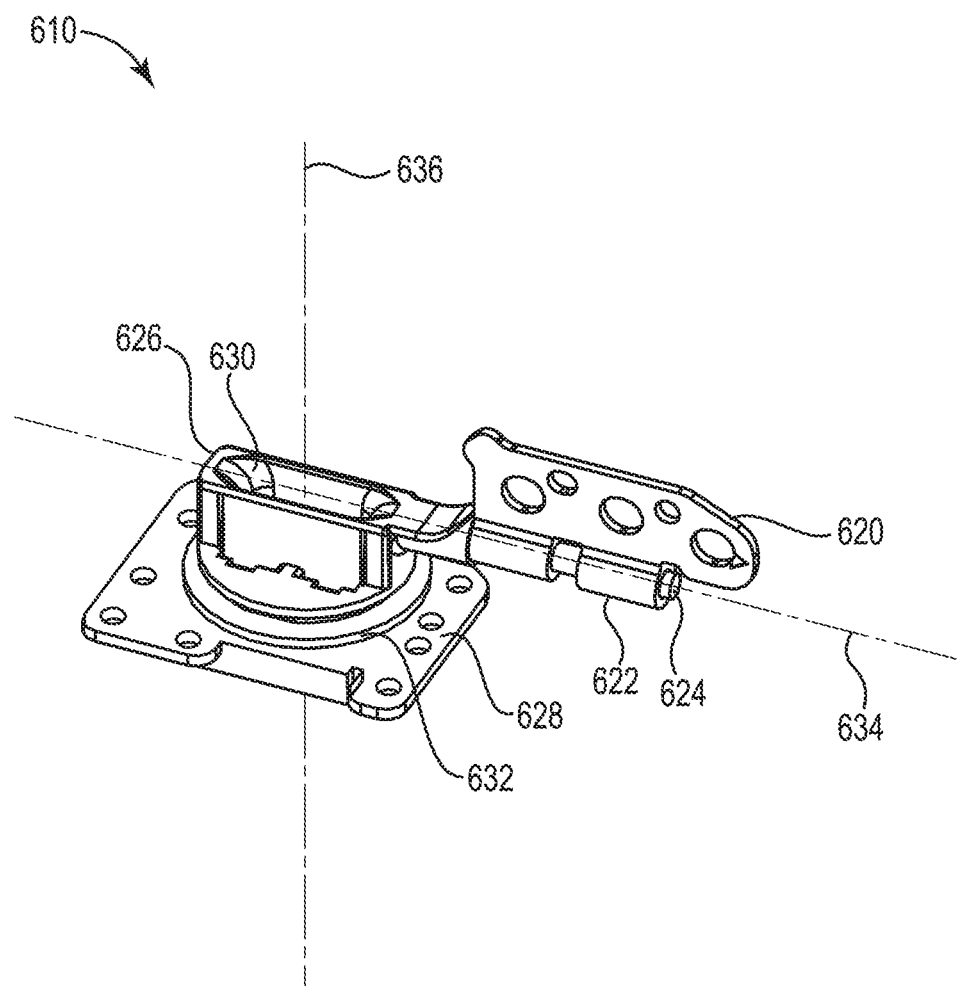
FIG. 6 illustrates an example of connection between a display housing and a segment of an input control housing according to the present disclosure.

FIG. 6 illustrates an example of connection 610 between a display housing and a segment of an input control housing according to the present disclosure. The connection 610 may include a hinge mechanism. The connection 610 may include a first leaf 620. The first leaf 610 may include a portion of a hinge extending laterally from a first knuckle 622 and is able to revolve around a pin 624. The first knuckle 622 may include a hollow circular portion forming a joint through which the pin 624 passes. The pin 624 may extend from a rotating body 626. Rotating body 626 may extend perpendicular to the rotational axis 634 traversing through the body of the pin 624.

The first knuckle 620 may be attached to a display housing. The display housing may be, through this attachment, rotatable about the pin 624. For example, the display housing may be rotatable three hundred and sixty degrees about a rotation axis 634 traversing through the body of the pin 624. The rotation may accommodate repositioning of the display. The rotation may accommodate the shutting of the display housing over the top of the input control housing, which may signal the computing device to enter a hibernation mode.

The connection 610 may include a second leaf 628. The second leaf 628 may be attached to a segment of an input control housing. The second leaf 628 may include a circular ledge 632 surrounding a cavity (illustrated occupied by the rotating body 626). A portion of the rotating body 626 may be seated within the second leaf 628. For example, the portion of the rotating body may be seated between the circular ledge 632 and the segment of the input control housing. The rotating body 626 may rotate within the space it occupies between the second leaf 628 and segment of an input control housing to which the second leaf 628 is attached. The rotatable body 626 may be rotatable three hundred and sixty degrees about a rotational axis 636 traveling through the center of the rotating body 626 perpendicular to rotational axis 634. A segment of an input control housing attached to the second leaf may rotate three hundred sixty degrees about the rotational axis 636.

Connection 610 may impart independent rotation and adjustment to a first input control segment, a second input control segment, and a display housing. The independent rotation of these components may accommodate biomechanical customization of a computing device to each individual and utilization of the computing device in a variety of configurations.

The connection 610 may attach a display housing to a first and second segment of an input control housing. The first and second segment of the input control housing are physically separate, but they may be integrated as physically separate components of a single computing device coupled together with the connection 610. The input control housing may function as an integrated component of a computing device. The segments of the input control housing may communicate with each other and with the display housing via wired connections. The connection 610 may include a cavity 630 that accommodates the wiring of the wired connections.

Figure 7:
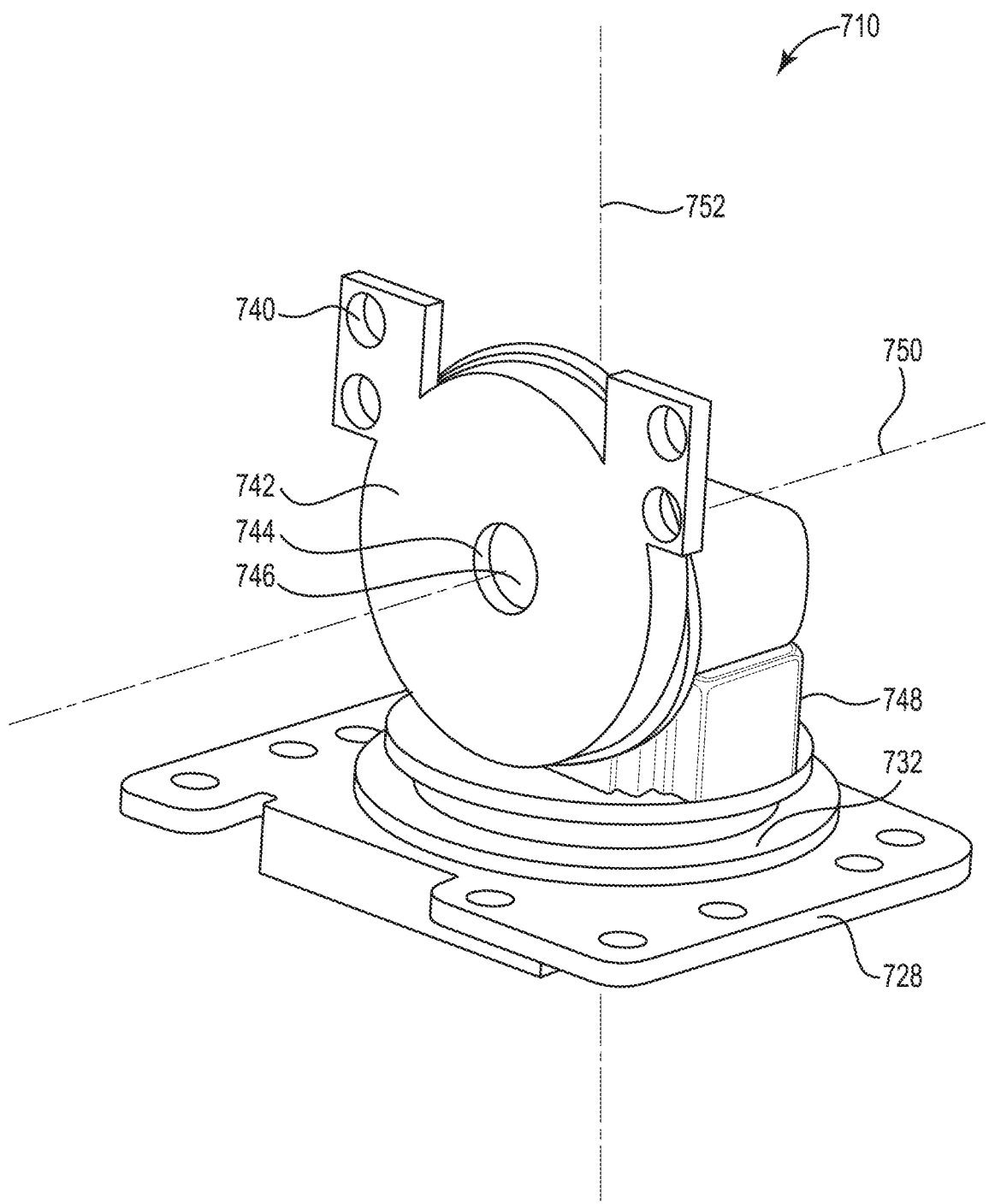
FIG. 7 illustrates another example of connection between a display housing and a segment of an input control housing according to the present disclosure.

FIG. 7 illustrates another example of connection 710 between a display housing and a segment of an input control housing according to the present disclosure. The connection 710 may include a hinge mechanism. The connection 710 may include a first leaf 740. The first leaf 740 may include a circular central body 742. The circular central body 742 may include a circular opening 744 in the center thereof. The circular opening 744 may extend around a pin 746. The circular central body 742 may be rotatable three hundred and sixty degrees around the pine 746. The pin 746 may extend from a rotating body 748.

The first leaf 740 may be attached to a display housing. For example, the first leaf may be attached to a side surface of the display housing that is not the same surface as the display or the surface opposite the display. The display housing may be, through this attachment, rotatable about the pin 746. For example, the display housing may be rotatable three hundred and sixty degrees about a rotation axis 750 traversing through the body of the pin 746. The rotation may accommodate repositioning of the display. The rotation may accommodate the shutting of the display housing over the top of the input control housing, which may signal the computing device to enter a hibernation mode.

The connection 710 may include a second leaf 728. The second leaf 728 may be attached to a segment of an input control housing. The second leaf 728 may include a circular ledge 732 surrounding a cavity (illustrated occupied by the rotating body 748). A portion of the rotating body 748 may be seated within the second leaf 728. For example, the portion of the rotating body may be seated between the circular ledge 732 and the segment of the input control housing. The rotating body 748 may rotate within the space it occupies between the second leaf 728 and segment of an input control housing to which the second leaf 728 is attached. The rotating body 748 may be rotatable three hundred and sixty degrees about a rotational axis 752 traveling through the center of the rotating body 748 perpendicular to rotational axis 750. A segment of an input control housing attached to the second leaf may rotate three hundred sixty degrees about the rotational axis 752.

Connection 710 may impart independent rotation and adjustment to a first input control segment, a second input control segment, and a display housing. The independent rotation of these components may accommodate biomechanical customization of a computing device to each individual and utilization of the computing device in a variety of configurations.

The connection 710 may attach a display housing to a first and second segment of an input control housing. The first and second segment of the input control housing are physically separate, but they may be integrated as physically separate components of a single computing device coupled together with the connection 710. The input control housing may function as an integrated component of a computing device. The segments of the input control housing may communicate with each other and with the display housing via wired connections. The connection 710 may include a cavity that accommodates the wiring of the wired connections.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. An input control housing of a computing device comprising:
   a first segment including a first portion of keyboard keys such that the keyboard keys are exposed and facing away from a face of the first segment on which the keyboard keys are mounted, the first segment connected to a display housing via a first connection; and
   a second segment, physically separate from the first segment, including a second portion of the keyboard keys, the second segment connected to the display housing via a second connection,
   wherein the first portion of the keyboard keys is rotatable three hundred and sixty degrees relative to and independent of the face of the first segment on which the first portion of the keyboard keys are mounted, wherein the first portion of the keyboard keys are re-mountable to the face of the first segment in a plurality of rotated orientations, wherein in each of the plurality of rotated orientations the keyboard keys remain exposed and facing away from the face of the first segment, and the second portion of the keyboard is rotatable three hundred and sixty degrees on a face of the second segment.

2. The input control housing of claim 1, wherein the first portion of the keyboard keys is physically separable from the first segment and the second portion of the keyboard keys is physically separable from the second segment.

3. The input control housing of claim 1, wherein the first segment is rotatable three hundred and sixty degrees about the first connection and the first portion of the keyboard keys is rotatable independent of the first segment and re-seatable at ninety degree increments on the face of the first segment.

4. A computing system comprising:
  a display housing; and
  an input control housing comprising:
    a first segment including a first portion of keyboard keys, the first segment connected to a first portion of the display housing via a first connection; and
    a second segment including a second portion of the keyboard keys, the second segment connected to a second portion of the display housing via a second connection,
  wherein the first segment is rotatable three hundred and sixty degrees about the first connection about a first rotational axis, wherein the second segment is rotatable three hundred and sixty degrees about the second connection, and wherein the display housing is rotatable three hundred and sixty degrees about the first connection point about a second rotational axis perpendicular to the first rotational axis.

5. The computing system of claim 4, wherein the display housing is rotatable three hundred and sixty degrees about the second connection point.

6. The computing system of claim 4, wherein the keyboard keys have a QWERTY layout.

7. The computing system of claim 4, wherein the first connection includes wiring to transmit digital signals between the first segment and the display housing.

8. The computing system of claim 7, wherein the second connection includes wiring to transmit digital signals between the second segment and the display housing.

9. The computing system of claim 4, wherein the display housing is rotatable about the first connection and the second connection to cover the first portion of the keyboard keys and the second portion of the keyboard keys.

10. The computing system of claim 9, wherein both the first segment and the second segment are rotatable to be substantially outside of a footprint of the display housing when a face of the display housing is oriented substantially parallel to a face of the first segment and a face of the second segment.

11. The computing system of claim 4, wherein the computing system operates under a first mode based on the first segment and the second segment having a first orientation and the computing system operates under a second mode based on the first segment and the second segment have a second orientation.

12. An input control housing comprising:
  a first segment including a first portion of keyboard keys, the first segment connected to a first portion of a display housing via a first connection, wherein:
    the first portion of keyboard keys mounted on a face of the first segment such that a surface including an input control is exposed and faces away from the face, removable from the face, rotatable three hundred and sixty degrees relative to and independent of the face, and re-seatable in a rotated orientation on the face wherein the surface including the input control remains exposed and faces away from the face; and
    the first segment is rotatable three hundred and sixty degrees about the first connection; and
  a second segment, physically separate from the first segment, including a second portion of the keyboard keys, the second segment connected to a second portion of the display housing via a second connection, wherein:
    the second portion of the keyboard keys is rotatable three hundred and sixty degrees on a face of the second segment; and
    the second segment is rotatable three hundred and sixty degrees about the second connection.

13. The input control housing of claim 12, wherein the first connection comprises:
  a first leaf mounted on the display housing;
  a first knuckle attached to the first leaf;
  a pin traversing through the first knuckle, the first knuckle to rotate about a rotation axis traversing through the pin;
  a rotating body, attached to one end of the pin, the rotating body extending perpendicular to the rotation axis of the pin; and
  a second leaf mounted on the first segment, wherein a portion of the rotating body distal to the pin is seated within the second leaf and is rotatable three hundred and sixty degrees within the second leaf.

14. The input control housing of claim 12, wherein the first connection comprises:
  a first leaf mounted on the display housing, wherein the first leaf has a circular central body that is rotatable three hundred and sixty degrees about a rotational axis traversing perpendicularly through the center of a face of the first leaf;
  a second leaf mounted on the first segment, wherein a portion of a connecting body connecting the first leaf with the second leaf is seated within the second leaf and is rotatable three hundred and sixty degrees within the second leaf.

15. The input control housing of claim 12, wherein the first portion of keyboard keys and the second portion of the keyboard keys are rotatable to maintain a QWERTY arrangement of the keyboard keys regardless of the angle of rotation of the first segment and the angle of rotation of the second segment.

* * * * *